United States Patent [19]

Tanaka et al.

[11] Patent Number: 4,831,256
[45] Date of Patent: May 16, 1989

[54] METHOD OF ADJUSTING RADIATION IMAGE READ-OUT CONDITIONS AND/OR IMAGE PROCESSING CONDITIONS

[75] Inventors: Hirosi Tanaka; Tokukazu Saito, both of Kanagawa, Japan

[73] Assignee: Fuji Photo Film Co., Ltd., Kanagawa, Japan

[21] Appl. No.: 706,418

[22] Filed: Feb. 27, 1985

[30] Foreign Application Priority Data

Feb. 28, 1984 [JP] Japan .................................. 59-37120

[51] Int. Cl.$^4$ ............................................. G01T 1/105
[52] U.S. Cl. ................................ 250/327.2; 250/484.1
[58] Field of Search ...................... 250/484.1, 327.2; 364/414; 358/284

[56] References Cited

U.S. PATENT DOCUMENTS

| | | | |
|---|---|---|---|
| 4,310,886 | 1/1982 | Kato et al. | 364/414 |
| 4,346,406 | 8/1982 | Kato et al. | 358/110 |
| 4,527,060 | 7/1985 | Suzuki et al. | |
| 4,527,061 | 7/1985 | Houkawa et al. | 250/327.2 |

*Primary Examiner*—Janice A. Howell
*Assistant Examiner*—Richard Hanig
*Attorney, Agent, or Firm*—Sughrue, Mion Zinn, Macpeak & Seas

[57] ABSTRACT

In a radiation image recording and reproducing system wherein preliminary read-out and final read-out are conducted for detecting a radiation image stored in a stimulable phosphor sheet, a characteristic value of the radiation image information of a specific region of the stimulable phosphor sheet is calculated on the basis of the radiation image information of the specific region obtained by the preliminary read-out. Final read-out conditions and/or image processing conditions are adjusted on the basis of the characteristic value, thereby simplifying the algorithm for the adjustment.

7 Claims, 1 Drawing Sheet

GENERAL IMAGE RECORDING

CHEST IMAGE RECORDING

METHOD OF ADJUSTING RADIATION IMAGE READ-OUT CONDITIONS AND/OR IMAGE PROCESSING CONDITIONS

BACKGROUND OF THE INVENTION

1. Field of the Invention

This invention relates to a method of adjusting radiation image read-out conditions and/or image processing conditions used in a radiation image recording and reproducing system. This invention particularly relates to a method of adjusting the read-out conditions and/or image processing conditions on the basis of radiation image information obtained by preliminary read-out in a radiation image recording and reproducing system wherein the preliminary read-out and the final read-out are carried out.

2. Description of the Prior Art

When certain kinds of phosphors are exposed to a radiation such as X-rays, α-rays, β-rays, γ-rays, cathode rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

One embodiment of the aforesaid radiation image recording and reproducing system is disclosed, for example, in Japanese Unexamined Patent Publication No. 58(1983)-67240. In the embodiment, before final read-out for scanning the stimulable phosphor sheet carrying a radiation image of an object stored therein by stimulating rays which cause the stimulable phosphor sheet to emit light in proportion to the radiation energy stored, detecting the emitted light by a photoelectric read-out means by use of predetermined read-out conditions and converting it into an electric image signal is conducted, preliminary read-out for approximately detecting the image information stored in the stimulable phosphor sheet is conducted by scanning the stimulable phosphor sheet with stimulating rays of a level lower than the level of the stimulating rays used in the final read-out and detecting the light emitted by the stimulable phosphor sheet during the scanning. The read-out conditions and/or image processing conditions for use in the image processing on the electric image signal obtained by the final read-out are adjusted on the basis of the radiation image information obtained by the preliminary read-out.

In the aforesaid radiation image recording and reproducing system wherein the preliminary read-out and the final read-out are carried out, by adjusting the read-out conditions and/or image processing conditions on the basis of the radiation image information obtained by the preliminary read-out, it becomes possible to eliminate adverse effects of a fluctuation in the level of the radiation energy stored in the stimulable phosphor sheet, which is caused by a change in the object or the image recording portion thereof, by a fluctuation in the radiation dose, or the like, and to obtain a visible image suitable for viewing, particularly for diagnostic purposes.

In Japanese Patent Application No. 59(1984)-12658, the applicant proposed a novel method of adjusting the read-out conditions on the basis of the radiation image information obtained by the preliminary read-out. The method comprises the steps of: (i) determining a histogram of the amount of the light emitted by a stimulable phosphor sheet during preliminary read-out by scanning the stimulable phosphor sheet with stimulating rays of a low level and detecting the light emitted by the stimulable phosphor sheet during the scanning, (ii) from the histogram, calculating the maximum light emission amount Smax and the minimum light emission amount Smin of a desired image information range in the histogram, and (iii) adjusting the read-out conditions so that the maximum light emission amount Smax and the minimum light emission amount Smin correspond respectively to the maximum signal level Qmax and the minimum signal level Qmin of a desired input signal range in the image processing means which are determined by the maximum density Dmax and the minimum density Dmin of a correct density range in the reproduced visible image.

In this method, by adjusting the read-out conditions so that the maximum light emission amount Smax and the minimum light emission amount Smin correspond to the maximum signal level Qmax and the minimum signal level Qmin, it is possible to simplify the subsequent image processing. However, since it is necessary to detect two values, i.e. the Smax and the Smin, from the histogram of the amount of light emitted by the stimulable phosphor sheet at the preliminary read-out step, the algorithm becomes complicated. Further, this method is expensive to carry out, and it takes a long time to detect the Smax and the Smin.

SUMMARY OF THE INVENTION

The primary object of the present invention is to provide a method of adjusting radiation image read-out conditions and/or image processing conditions, which simplifies the algorithm for adjusting the read-out conditions and/or image processing conditions on the basis of the radiation image information obtained by the preliminary read-out.

Another object of the present invention is to provide a method of quickly adjusting the radiation image read-out conditions and/or image processing conditions by use of an inexpensive device.

The present invention provides a method of adjusting radiation image read-out conditions and/or image processing conditions in which, before final read-out by scanning a stimulable phosphor sheet carrying a radiation image of an object stored therein with stimulating rays which cause the stimulable phosphor sheet to emit light in proportion to the radiation energy stored, detecting the emitted light by a photoelectric read-out means by use of read-out conditions and converting the emitted light into an electric image signal is carried out, preliminary read-out for approximately detecting the image information stored in the stimulable phosphor sheet is conducted by scanning the stimulable phosphor sheet with stimulating rays of a level lower than the level of the stimulating rays used in the final read-out and detecting the light emitted by the stimulable phosphor sheet during the scanning, and the read-out conditions and/or image processing conditions for use in an image processing on the electric image signal obtained by the final read-out are adjusted on the basis of the radiation image information obtained by the preliminary read-out, wherein the improvement comprises calculating a characteristic value of the radiation image information of a specific region of said stimulable phosphor sheet on the basis of the radiation image information of said specific region among all radiation image information obtained by said preliminary read-out, and adjusting said read-out conditions and/or said image processing conditions on the basis of said characteristic value.

By the term "read-out conditions" as used herein are meant various conditions affecting the relationship between the amount of the light emitted by the stimulable phosphor sheet at the read-out step and the output of the read-out apparatus, for example, the read-out gain determining the relationship between the input and the output of the read-out apparatus, the scale factor, and the power of the stimulating rays used for read-out.

By "image processing conditions" are meant various conditions affecting the relationship between the electric image signal fed to the image processing means and the electric image signal generated thereby, for example, gradation processing conditions.

As described above, the level of the stimulating rays used in the preliminary read-out should be lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by a ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the present invention, the whole surface of the stimulable phosphor sheet is scanned by stimulating rays at the preliminary read-out step. On the basis of the radiation image information of a specific region of the stimulable phosphor sheet, for example, the center region thereof, among all radiation image information detected from the light emitted by the stimulable phosphor sheet in the preliminary read-out, a characteristic value of the radiation image information of the specific region, for example, a mean value Sav of the amounts of the light emitted by all points in the specific region, is calculated. The read-out conditions and/or image processing conditions are adjusted on the basis of the mean value Sav.

The specific region of the stimulable phosphor sheet may be an arbitrary region, for example, the center region of the sheet. The specific region need not necessarily be a single portion of the stimulable phosphor sheet and may consist of a plurality of portions. The specific region may be selected in accordance with the image recording portion of an object and/or image recording conditions.

The characteristic value of the radiation image information is a value representing the radiation image information and may, for example, be the mean value of the radiation image information or the amounts of the light emitted by all points in the specific region of the stimulable phosphor sheet.

The read-out conditions and the image processing conditions are adjusted for obtaining a visible image suitable for viewing, particularly for diagnostic purposes, in accordance with the image recording portion and/or image recording conditions. The read-out conditions are adjusted also for the purpose of sending the electric image signal in a desirable condition to the image processing means.

Therefore, in general, the read-out conditions and the image processing conditions are basically determined by the image recording portion and/or image recording conditions which are known in advance, and are ultimately adjusted on the basis of the radiation image information recorded in the stimulable phosphor sheet and obtained by the preliminary read-out.

That is, when the read-out conditions and/or image processing conditions are adjusted on the basis of the radiation image information grasped by the method of the present invention, they are adjusted on the basis of not only the characteristic value of the radiation image information of the specific region obtained by the preliminary read-out but also the image recording portion and/or image recording conditions.

Accordingly, when the read-out conditions are adjusted, it is possible to adjust the read-out gain on the basis of the characteristic value, and to adjust the scale factor on the basis of the image recording portion and/or image recording conditions.

In this case, it is possible to adjust the read-out gain so that, for example, the characteristic value Sav becomes equal to an input signal value Qav of the image processing means.

Also, when the image processing conditions are adjusted, it is possible to adjust the gradation processing conditions among the image processing conditions on the basis of the characteristic value Sav.

As described below, the method of the present invention is advantageous, for example, over the method wherein a histogram of the amount of light emitted by the whole surface of the stimulable phosphor sheet is determined, the maximum light emission amount Smax and the minimum light emission amount Smin of a desired image information range are calculated from the histogram, and the read-out conditions and/or image processing conditions are adjusted on the basis of the Smax and the Smin. In the present invention, only the radiation image information of a specific region of the stimulable phosphor sheet is used instead of the radiation image information of the whole surface of the stimulable phosphor sheet. From the radiation image information of the specific region, a single characteristic value of the radiation image information is calculated. On the basis of the single characteristic value, the read-out conditions and/or image processing conditions are adjusted. Therefore, it becomes possible to simplify the algorithm for adjusting the read-out conditions and/or image processing conditions, and to reduce the cost of the device for adjusting the conditions. Further, it becomes possible to shorten the time for adjusting the read-out conditions and/or image processing conditions.

DESCRIPTION OF THE PREFERRED EMBODIMENTS

The present invention will hereinbelow be described in further detail with reference to the accompanying drawings.

Figure 1:
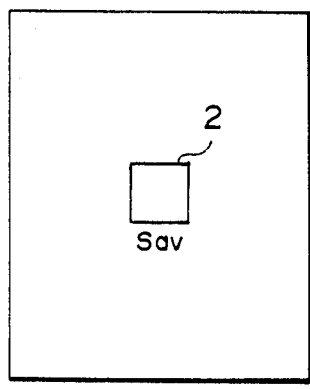
FIG. 1 is a schematic view showing an example of the specific region in the case of general image recording.

FIG. 1 shows an example of the specific region in the case of general image recording. In the case of general image recording, since the region which should be diagnosed is usually the center region of a stimulable phosphor sheet 1, the center region thereof is selected as a specific region 2. When preliminary read-out is conducted, the whole surface of the stimulable phosphor sheet 1 is scanned by stimulating rays which cause the sheet 1 to emit light in proportion to the radiation energy stored. Of the emitted light, only the light emitted by the specific region 2 is detected. A mean value Sav of the amounts of light emitted by all points in the specific region 2, i.e. the mean amount of light emitted per picture element in the specific region 2, is calculated as a characteristic value Sch. The read-out gain is adjusted so that the mean value Sav becomes a desired input signal value Qav in the image processing means, i.e. so that the electric signal value Qav is obtained when the mean value Sav is detected by the photoelectric read-out means by use of the read-out gain. That is, the read-out gain is adjusted by the function f(Sav, Qav), i.e. read-out scale factor.

Figure 2:
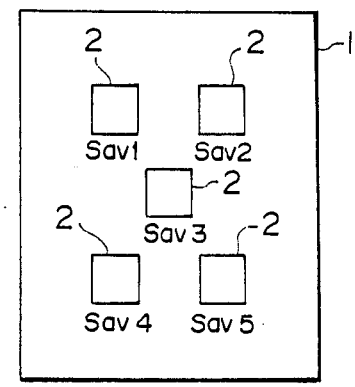
FIG. 2 is a schematic view showing an example of the specific region in the case of chest image recording.

In the case of chest image recording, since the amount of the light emitted by the portion of the stimulable phosphor sheet 1 where an image of the lungs is recorded is important, the specific region 2 should preferably be constituted by five sections as shown in FIG. 2 so that the specific region 2 corresponds to the lungs even in the front or lateral image recording or even when the stimulable phosphor sheet 1 is positioned upside down in image read-out. In this case, it is possible to weight the mean values of the light emission amounts at the five sections and to use the maximum among the weighted mean values as the characteristic value Sch of the radiation image information of the specific region 2. The characteristic value Sch is expressed by $$Sch = Max(m_1 Sav_1, m_2 Sav_2, m_3 Sav_3, m_4 Sav_4, m_5 Sav_5)$$

where m1 to m5 denote predetermined constants. By use of the characteristic value Sch, the read-out gain may be adjusted by the function f(Sch, Qav), i.e. read-out scale factor as in the case of the general image recording.

When the image processing conditions are determined in advance, the input electric signal value Qav to the image processing means may be calculated as the desired input signal value at the image processing means corresponding to a correct density Dav of a reproduced visible image in accordance with the image processing conditions.

Instead of using the mean value as the characteristic value of the radiation image information of the specific region, it is also possible to determine a histogram of the amount of the light emitted by the specific region and to use the central value of the histogram as the characteristic value. In this case, the input electric signal value Qav should also be preferably adjusted to suit the central value of the histogram.

As the characteristic value in the case of chest image recording, it is also possible to use the sum of the weighted mean values at the five sections of the specific region, i.e.

$$Sch = m_1 Sav_1 + m_2 Sav_2 + m_3 Sav_3 + m_4 Sav_4 + m_5 Sav_5$$

The embodiments in the cases of general image recording and chest image recording will be described in further detail below.

Figure 3:
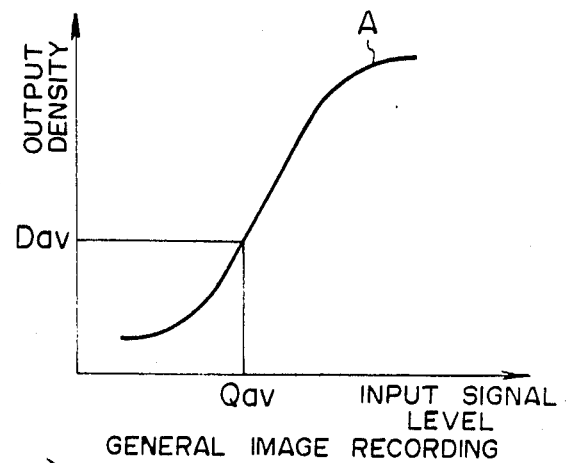
FIG. 3 is a graph showing a gradation curve A in the image processing means in the case of general image recording.

In the case of general image recording, the output density at the center region as the specific region should preferably be within the range of approximately 0.4 to approximately 1.2. When the gradation curve in the image processing means suitable for the general image recording is the gradation curve A as shown in FIG. 3, the level of the input electric signal of the image processing means corresponding to the output density within the range of 0.4 to 1.2 corresponds to 20% to 50% of the signal latitude of the image processing means. Therefore, the read-out conditions may be adjusted so that the characteristic value Sch of the radiation image information of the specific region obtained by the preliminary read-out is within the range of 20% to 50% of the signal latitude of the image processing means.

Figure 4:
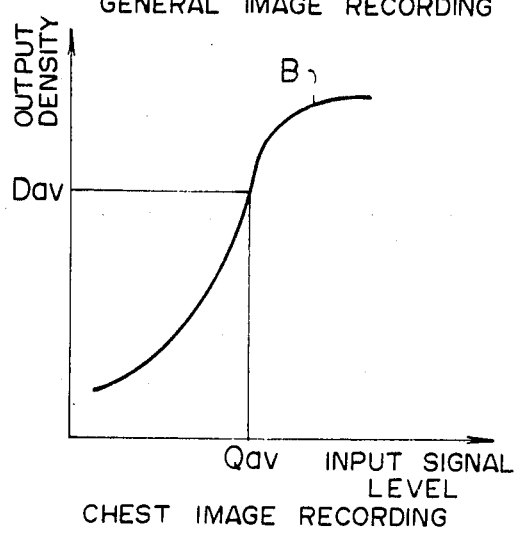
FIG. 4 is a graph showing a gradation curve B in the image processing means in the case of chest image recording.

In the case of chest image recording, the output density of the image of the lungs should preferably be within the range of approximately 1.6 to approximately 1.8. When the gradation curve suitable for the chest image recording is the gradation curve B as shown in FIG. 4, the level of the input electric signal of the image processing means corresponding to the output density of 1.6 corresponds to approximately 60% of the signal latitude of the image processing means. Therefore, the read-out conditions may be adjusted so that the characteristic value Sch obtained by the preliminary read-out corresponds to approximately 60% of the signal latitude of the image processing means.

We claim:

1. A method of adjusting radiation image read-out conditions and/or image processing conditions in which before final read-out by scanning a stimulable phosphor sheet carrying a radiation image of an object stored therein with stimulating rays which cause the stimulable phosphor sheet to emit light in proportion to the radiation energy stored, detecting the emitted light by a photoelectric read-out means by use of read-out conditions and converting the emitted light into an electric image signal is carried out, preliminary read-out for approximately detecting the image information stored in the stimulable phosphor sheet is conducted by scanning the stimulable phosphor sheet with stimulating rays of a level lower than the level of the stimulating rays used in the final read-out and detecting the light emitted by the stimulable phosphor sheet during the scanning, and the read-out conditions and/or image processing conditions for use in an image processing on the electric image signal obtained by the final read-out are adjusted on the basis of the radiation image information obtained by the preliminary read-out, wherein the improvement comprises calculating a characteristic value of the radiation image information of a specific region of said stimulable phosphor sheet on the basis of the radiation image information of said specific region among all radiation image information obtained by said preliminary read-out, and adjusting said final read-out conditions and/or said image processing conditions on the basis of said characteristic value.

2. A method as defined in claim 1 wherein said characteristic value is a mean value of the amounts of light emitted by all points in said specific region of said stimulable phosphor sheet.

3. A method as defined in claim 2 wherein said read-out conditions are adjusted so that said mean value corresponds to a desired electric signal value sent to the image processing step.

4. A method as defied in claim 1 wherein said characteristic value is a central value of a histogram of the amount of light emitted by said specific region of said stimulable phosphor sheet.

5. A method as defined in claim 4 wherein an electric signal value sent to the image processing step is adjusted to suit said central value of said histogram.

6. A method as defined in claim 1 wherein said specific region is constituted by a plurality of sections, and the maximum among weighted mean values of the light emission amounts at said sections is used as said characteristic value.

7. A method as defined in claim 1 wherein said specific region is constituted by a plurality of sections, and the sum of weighted mean values of the light emission amounts at said sections is used as said characteristic value.

* * * * *